(12) United States Patent
Howe

(10) Patent No.: US 11,017,383 B2
(45) Date of Patent: May 25, 2021

(54) METHOD AND SYSTEM FOR IDENTIFYING MERCHANTS SELLING RANSOMWARE

(71) Applicant: MASTERCARD INTERNATIONAL INCORPORATED, Purchase, NY (US)

(72) Inventor: Justin X. Howe, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1416 days.

(21) Appl. No.: 14/560,652

(22) Filed: Dec. 4, 2014

(65) Prior Publication Data

US 2016/0162886 A1    Jun. 9, 2016

(51) Int. Cl.
*G06Q 20/38* (2012.01)
*G06F 21/56* (2013.01)

(52) U.S. Cl.
CPC ........... *G06Q 20/382* (2013.01); *G06F 21/56* (2013.01)

(58) Field of Classification Search
CPC .............................. G06Q 20/382; G06F 21/56
See application file for complete search history.

(56) References Cited

U.S. PATENT DOCUMENTS

| | | | | |
|---|---|---|---|---|
| 2009/0300589 A1* | 12/2009 | Watters | .................. | G06Q 40/00 717/140 |
| 2011/0219448 A1* | 9/2011 | Sreedharan | ........... | G06F 21/566 726/23 |
| 2011/0307382 A1* | 12/2011 | Siegel | ................ | G06Q 20/4016 705/44 |
| 2012/0158541 A1* | 6/2012 | Ganti | .................. | H04L 63/1425 705/26.35 |
| 2014/0122343 A1* | 5/2014 | Einav | ................. | G06Q 20/4016 705/67 |
| 2014/0181971 A1* | 6/2014 | Tatarinov | .............. | G06F 21/566 726/23 |

(Continued)

OTHER PUBLICATIONS

U.S. Appl. No. 62/032,066, filed Aug. 1, 2014.

*Primary Examiner* — Jay Huang
*Assistant Examiner* — Courtney P Jones
(74) *Attorney, Agent, or Firm* — Buchanan Ingersoll & Rooney PC

(57) ABSTRACT

A method for identifying a merchant associated with ransomware includes: storing, in a profile database, a plurality of merchant profiles, wherein each merchant profile is related to a merchant and includes at least a merchant identifier; receiving, by a receiving device, an authorization request for a payment transaction, wherein the authorization request includes a specific merchant identifier associated with a merchant involved in the payment transaction, and the payment transaction is initiated by a computing device infected with one or more ransomware application programs; identifying, by a processing device, a specific merchant profile in the profile database where the included merchant identifier corresponds to the specific merchant identifier included in the received authorization request; and updating, by the processing device, the specific merchant profile in the profile database to include an indication that the related merchant is associated with the distribution of the one or more ransomware application programs.

18 Claims, 5 Drawing Sheets

(56) References Cited

U.S. PATENT DOCUMENTS

| | | | | |
|---|---|---|---|---|
| 2014/0373153 | A1* | 12/2014 | Niemela | G06F 21/554 |
| | | | | 726/24 |
| 2015/0172305 | A1* | 6/2015 | Dixon | G06F 21/53 |
| | | | | 726/23 |
| 2016/0337378 | A1* | 11/2016 | Wan | H04L 63/14 |
| 2017/0103399 | A1* | 4/2017 | Napsky | G06Q 30/0609 |

* cited by examiner

US 11,017,383 B2

METHOD AND SYSTEM FOR IDENTIFYING MERCHANTS SELLING RANSOMWARE

FIELD

The present disclosure relates to the identification of merchants associated with ransomware, specifically the identification of a merchant via an authorization request for a transaction initiated by a computing device infected with ransomware for association thereof.

BACKGROUND

Ransomware is a type of malware that infects a computing device and restricts access to one or more components of the system, demanding that a ransom be paid by a user prior to allowing access to the restricted components. Ransomware exists in a number of forms, and is propagated and operates in a variety of ways, with some propagating as a trojan or by imitating other applications or services, and operating via encryption of personal files or prohibiting access to documents or services. While ransomware can be circumvented in some instances, and can also often be illegal in terms of operation and/or propagation, many users elect to pay the ransom in order to remove the malware, with some being unaware the illegitimacy of the program and others not finding fighting the program to be worth the effort.

As a result, the ransomware industry receives a significant amount of money each year by taking advantage of uninformed and sometimes unsuspecting users, often through illegal means. However, because of the nature of computing devices and the propagation of ransomware, it is often difficult to identify the entities involved in the distribution of and profiting from the programs. While the point of contact for a ransomware program may be identified, such as a specific website or an application program, identifying the source of the ransomware from the point of contact can be exceedingly more difficult. Furthermore, in some instances, a distributor of ransomware may be entirely unaware that they are distributing the malware, due to illegal forms of propagation employed by nefarious entities.

Thus, there is a need for a technical system to identify entities associated with the distribution of ransomware programs. By paying the ransom demanded by such programs, and monitoring the payment as it is made in a payment network, a merchant that is associated with, and thereby profiting from, the ransomware can be identified, without the need to perform difficult, and sometimes impossible, analysis of installed ransomware and the distribution thereof.

SUMMARY

The present disclosure provides a description of systems and methods for identifying merchants associated with ransomware.

A method for identifying a merchant associated with ransomware includes: storing, in a profile database, a plurality of merchant profiles, wherein each merchant profile is related to a merchant and includes at least a merchant identifier; receiving, by a receiving device, an authorization request for a payment transaction, wherein the authorization request includes a specific merchant identifier associated with a merchant involved in the payment transaction, and the payment transaction is initiated by a computing device infected with one or more ransomware application programs; identifying, by a processing device, a specific merchant profile in the profile database where the included merchant identifier corresponds to the specific merchant identifier included in the received authorization request; and updating, by the processing device, the specific merchant profile in the profile database to include an indication that the related merchant is associated with the distribution of the one or more ransomware application programs.

A system for identifying a merchant associated with ransomware includes a profile database, a receiving device, and a processing device. The profile database is configured to store a plurality of merchant profiles, wherein each merchant profile is related to a merchant and includes at least a merchant identifier. The receiving device is configured to receive an authorization request for a payment transaction, wherein the authorization request includes a specific merchant identifier associated with a merchant involved in the payment transaction, and the payment transaction is initiated by a computing device infected with one or more ransomware application programs. The processing device is configured to: identify a specific merchant profile in the profile database where the included merchant identifier corresponds to the specific merchant identifier included in the received authorization request; and update the specific merchant profile in the profile database to include an indication that the related merchant is associated with the distribution of the one or more ransomware application programs.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
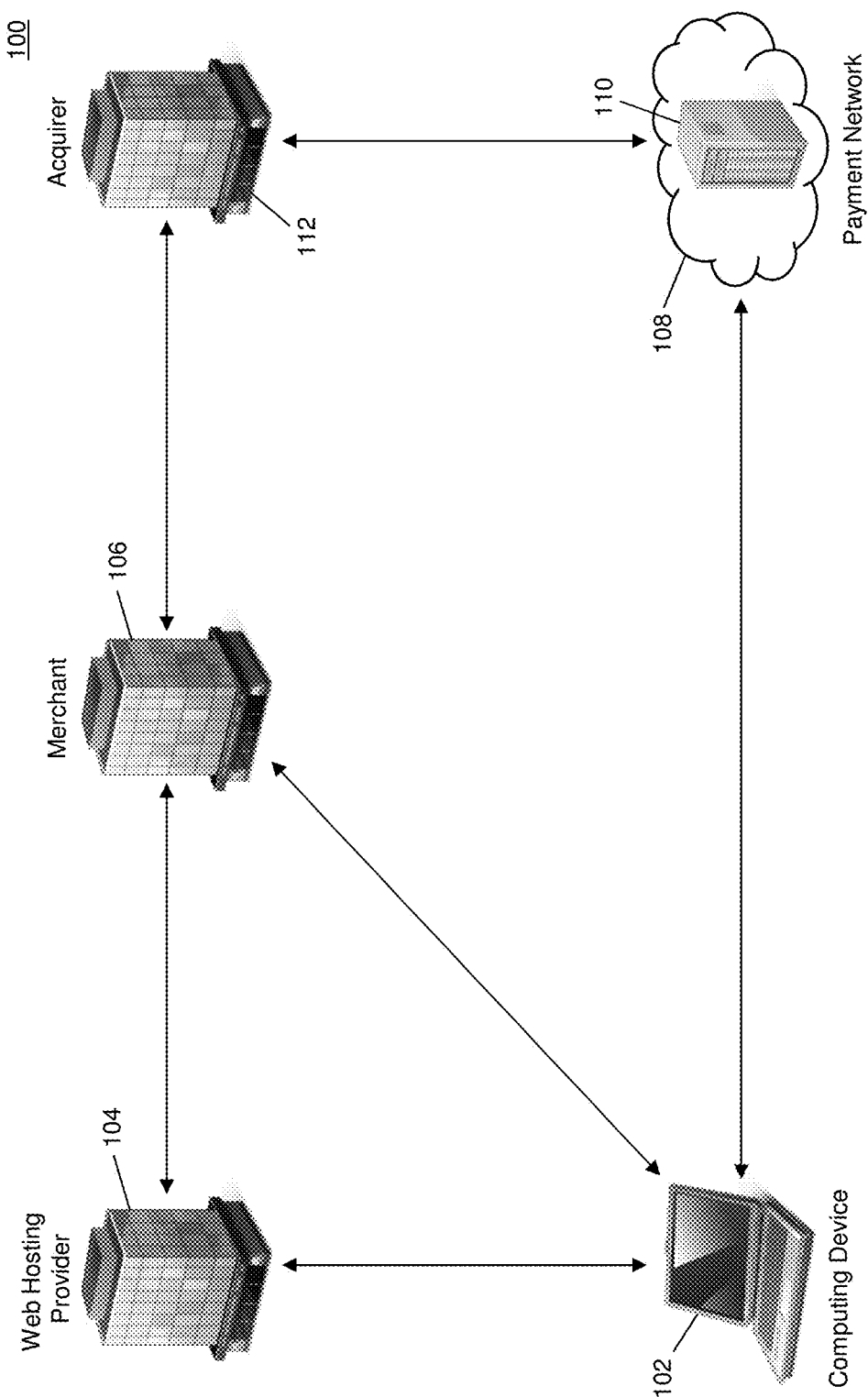
FIG. 1 is a block diagram illustrating a high level system architecture for identifying merchants associated with ransomware in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Identifying Merchants Associated with Ransomware

FIG. 1 illustrates a system 100 for the identification of merchants associated with ransomware using payment transaction data.

In the system 100, a computing device 102 may get infected with ransomware. The computing device 102 may be any type of device able to be infected with ransomware or a similar malware program or application, such as a desktop computer, laptop computer, notebook computer, tablet computer, personal digital assistant, cellular phone, smart phone, smart watch, smart television, etc. The computing device 102 may get infected with the ransomware via a web hosting provider 104. The ransomware may be delivered via an application program that is manually downloaded by a user of the computing device 102, automatically downloaded to the computing device 102 by the web hosting provider 104, or distributed in any other suitable method. It will be apparent to persons having skill in the relevant art that the web hosting provider 104 may be replaced by any other entity capable of distributing ransomware, either intentionally or unknowingly, such as an electronic mail provider, internet service provider, etc.

The ransomware may be developed by, distributed by, commissioned by, or otherwise associated with a merchant 106. The ransomware may instruct a user of the computing device 102 to initiate a payment transaction in order to remove the ransomware or to provide access to one or more components or services of the computing device 102 that has been restricted by the ransomware. In some instances, the ransomware may prohibit the user of the computing device 102 from being aware as to what entity to which the payment is being made.

The user may then initiate a payment transaction using the computing device 102. As part of the initiation of the payment transaction, payment details for use in funding the payment transaction (e.g., for payment to the merchant 106) may be transmitted to the merchant 106. In some embodiments, the computing device 102 may also transmit a device identifier associated with the computing device 102 as part of the payment transaction initiation, such as a media access control address, internet protocol address, username, email address, phone number, etc.

The merchant 106 may receive the payment details and may forward the payment details and other transaction data for the payment transaction, such as a transaction amount, to an acquirer 112. The acquirer 112 may be a financial institution associated with the merchant 106, such as an acquiring bank, which may hold a merchant account associated with the merchant 106. The acquirer 112 may generate an authorization request for the payment transaction and submit the authorization request to a payment network 108. In some embodiments, the authorization request may be generated and submitted to the payment network 108 directly by the merchant 106.

The payment network 108 may include a processing server 110. The processing server 110, discussed in more detail below, may be configured to identify the payment transaction as one associated with ransomware. In some embodiments, the identification may be based on the device identifier associated with the computing device 102 if included in the authorization request, which may be known by the processing server 110 as being associated with a computing device 102 infected with ransomware. In other embodiments, the identification may be based on transaction details provided by the computing device 102 for matching with the received authorization request that are indicated to being associated with a purchase related to ransomware.

In one example, the computing device 102 may be operated by, on behalf of, or may otherwise be associated with the payment network 108. The payment network 108 may use the computing device 102 to deliberately become infected with ransomware by setting it up as a honeypot. A honeypot, as known in computer terminology, is a trap set to detect, deflect, or, in some manner, counteract attempts at unauthorized use of information systems. Generally, a honeypot consists of a computer, data, or a network site that is isolated and monitored, and which seems to have vulnerabilities, or contain information or a resource of value to attackers or the person who controls the honeypot. The payment network 108 may then initiate the payment transaction to pay the demanded ransom using the computing device 102. When the authorization request is transmitted to the payment network 108, the payment network 108 can identify that the payment transaction is the one associated with payment of the demanded ransom, such as via a device identifier associated with the computing device 102, known transaction details (e.g., time of initiation of the payment transaction, transaction amount, etc.), payment method (e.g., using a known transaction account), etc.

Once the authorization request is known to be associated with ransomware, the processing server 110 may identify the merchant 106 involved in the payment transaction via a merchant identifier included in the authorization request. The processing server 110 may thereby associate the merchant 106 with the distribution of ransomware. The processing server 110 and/or payment network 108 may then take appropriate action depending on the circumstances of the distribution and/or use of the ransomware by the merchant 106. For instance, the payment network 108 may notify a governmental or regulatory agency or the acquirer 112 of the merchant's 106 association with ransomware. In another example, the payment network 108 may place the merchant 106 on a list that indicates that the merchant 106 is a high risk merchant, and may alert the acquirer 112 and other financial institutions thereof. In yet another example, the payment network 108 may impress additional transaction fees on the merchant 106 as a result of the merchant's status. Additional measures that may be taken by the payment network 108 can be found in U.S. Provisional Patent Application No. 62/032,066, filed Aug. 1, 2014, which is herein incorporated by reference in its entirety.

Once the processing server 110 has identified the merchant 106, the processing server 110, or another computing device of the payment network 108, may process the payment transaction. In some embodiments, the payment network may initiate and process a chargeback against the merchant 106 for the payment transaction as a result of the ransom.

Identification of merchants 106 as being associated with ransomware using transaction data as discussed herein may be beneficial, as it may enable governmental and regulatory agencies to more easily and more efficiently take appropriate action against the merchants 106. In addition, by indicating that the merchant 106 is a high risk merchant, such as to acquirers 112 and other financial institutions, the payment network 108 may make it more difficult for the merchant 106 to profit from the distribution and use of ransomware, which may in turn decrease the losses suffered by users. As a result, not only may the methods and systems discussed herein identify merchants associated with ransomware more quickly and more easily than existing systems, but by identifying the merchants at a payment network and using transaction data, the merchants may also be actively discouraged from continuing illegal practices as well.

Processing Server

Figure 2:
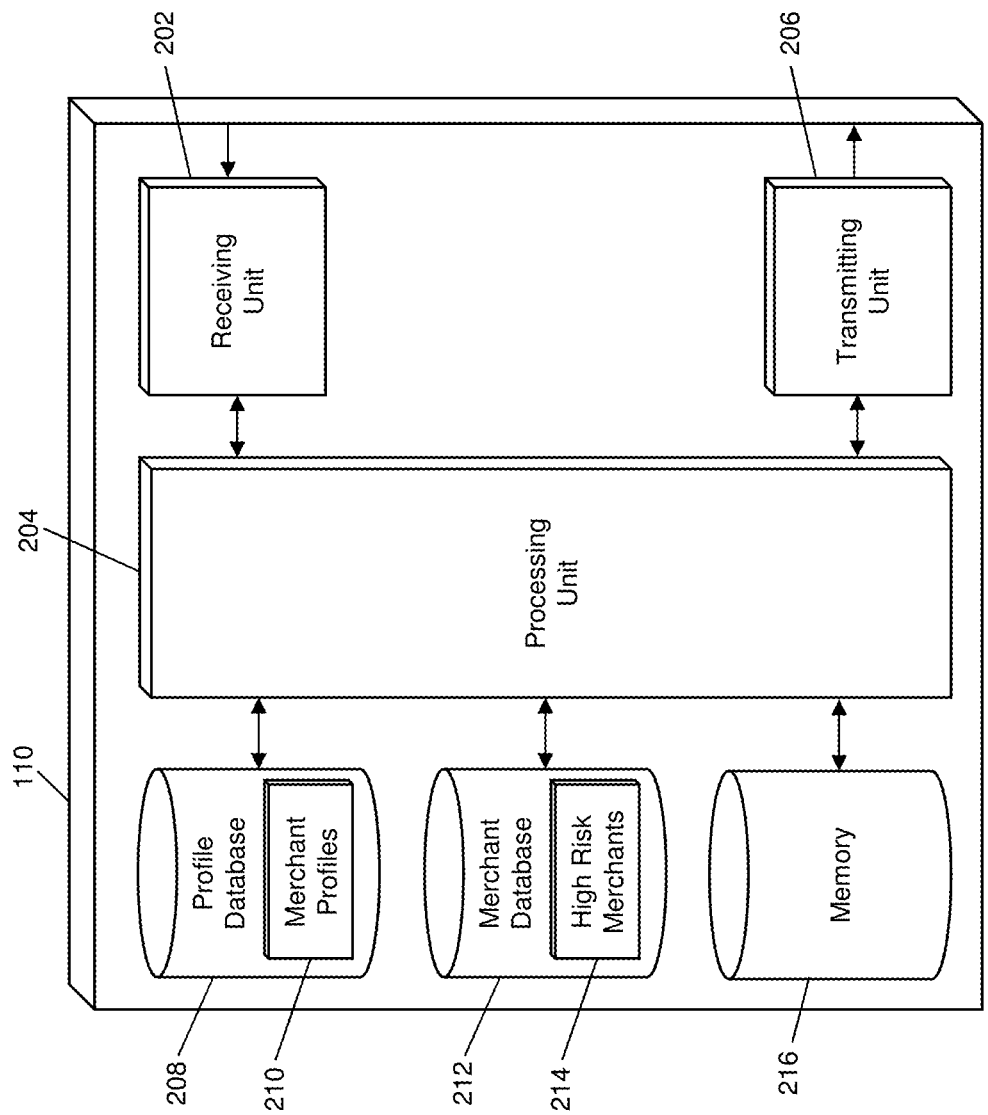
FIG. 2 is a block diagram illustrating the processing server 102 of FIG. 1 for the identification of merchants associated with ransomware in accordance with exemplary embodiments.

FIG. 2 illustrates an embodiment of the processing server 110 of the system 100. It will be apparent to persons having skill in the relevant art that the embodiment of the processing server 110 illustrated in FIG. 2 is provided as illustration only and may not be exhaustive to all possible configurations of the processing server 110 suitable for performing the functions as discussed herein. For example, the computer system 500 illustrated in FIG. 5 and discussed in more detail below may be a suitable configuration of the processing server 110.

The processing server 110 may include a profile database 208. The profile database 208 may include a plurality of merchant profiles 210. Each merchant profile 210 may include data related to a merchant 106 including at least a merchant identifier. The merchant identifier may be a unique value associated with the merchant profile 210 and/or related merchant 106 for identification thereof, such as a merchant identification number, reference number, serial number, point of sale identifier, transaction account number, merchant name, etc.

The processing server 110 may also include a receiving unit 202. The receiving unit 202 may be configured to receive data over one or more networks via one or more network protocols. The receiving unit 202 may receive authorization requests for payment transactions, such as from merchants 106 and acquirers 112 or from the payment network 108. Received authorization requests may include at least a specific merchant identifier associated with the merchant 106 involved in the corresponding payment transaction. The received authorization requests may also be for payment transactions associated with ransomware, which may be indicated via data included in the authorization request, such as a device identifier (e.g., associated with the computing device 102), payment details, or a data value indicative of the payment transaction being associated with ransomware.

The processing server 110 may also include a processing unit 204. The processing unit 204 may be configured to perform the functions of the processing server 102 discussed herein as will be apparent to persons having skill in the relevant art. The processing unit 204 may identify a merchant profile 210 in the profile database 208 associated with the merchant 106 involved in the ransomware transaction based on the specific merchant identifier included in the received authorization request. The processing unit 204 may be further configured to update the identified merchant profile 210 to indicate that the merchant 106 is associated with the distribution of ransomware.

In some embodiments, the processing server 110 may further include a merchant database 212. The merchant database 212 may include a plurality of high risk merchants 214. Each high risk merchant 214 may be a merchant identifier, merchant profile 210, or other data associated with a merchant 106 that has been identified by the processing unit 204 as being associated with the distribution of ransomware. In some embodiments, data associated with the high risk merchants 214 included in the merchant database 212 may be provided to third party entities, such as acquirers 112, governmental agencies, etc. In some instances, the payment network 108 (e.g., and the processing server 110) may be configured to impose additional processing costs for payment transactions on the high risk merchants 214 due to their status as being a high risk.

The processing server 110 may also include a transmitting unit 206. The transmitting unit 206 may be configured to transmit data over one or more networks via one or more network protocols. The transmitting unit 206 may transmit notifications to acquirers 112, governmental or regulatory agencies, and third parties indicating that the merchant 106 has been identified as being associated with the distribution of ransomware. The transmitting unit 206 may also be configured to transmit authorization responses for payment transactions, such as for the payment transaction in which the merchant 106 was identified as being associated with the distribution of ransomware.

The processing server 102 may further include a memory 216. The memory 216 may be configured to store data for the processing server 110 suitable for performing the functions discussed herein. For example, the memory 216 may store device identifiers for computing devices 102 that are infected with ransomware, transaction account details for transaction accounts used to pay ransom, transaction details used to identify authorization requests for transaction associated with the distribution of ransomware, etc. Additional data that may be included in the memory 216 will be apparent to persons having skill in the relevant art.

It will be further apparent to persons having skill in the relevant art that the processing server 110 may include additional and/or alternative components and that the components of the processing server 110 illustrated in FIG. 2 and discussed herein may be configured to perform additional functions. For instance, in embodiments where the processing server 110 may be configured to process payment transactions for the payment network 108, the components of the processing server 110 may be further configured to perform functions associated with the processing of payment transactions.

Process for Identifying Merchants Associated with Ransomware

Figure 3:
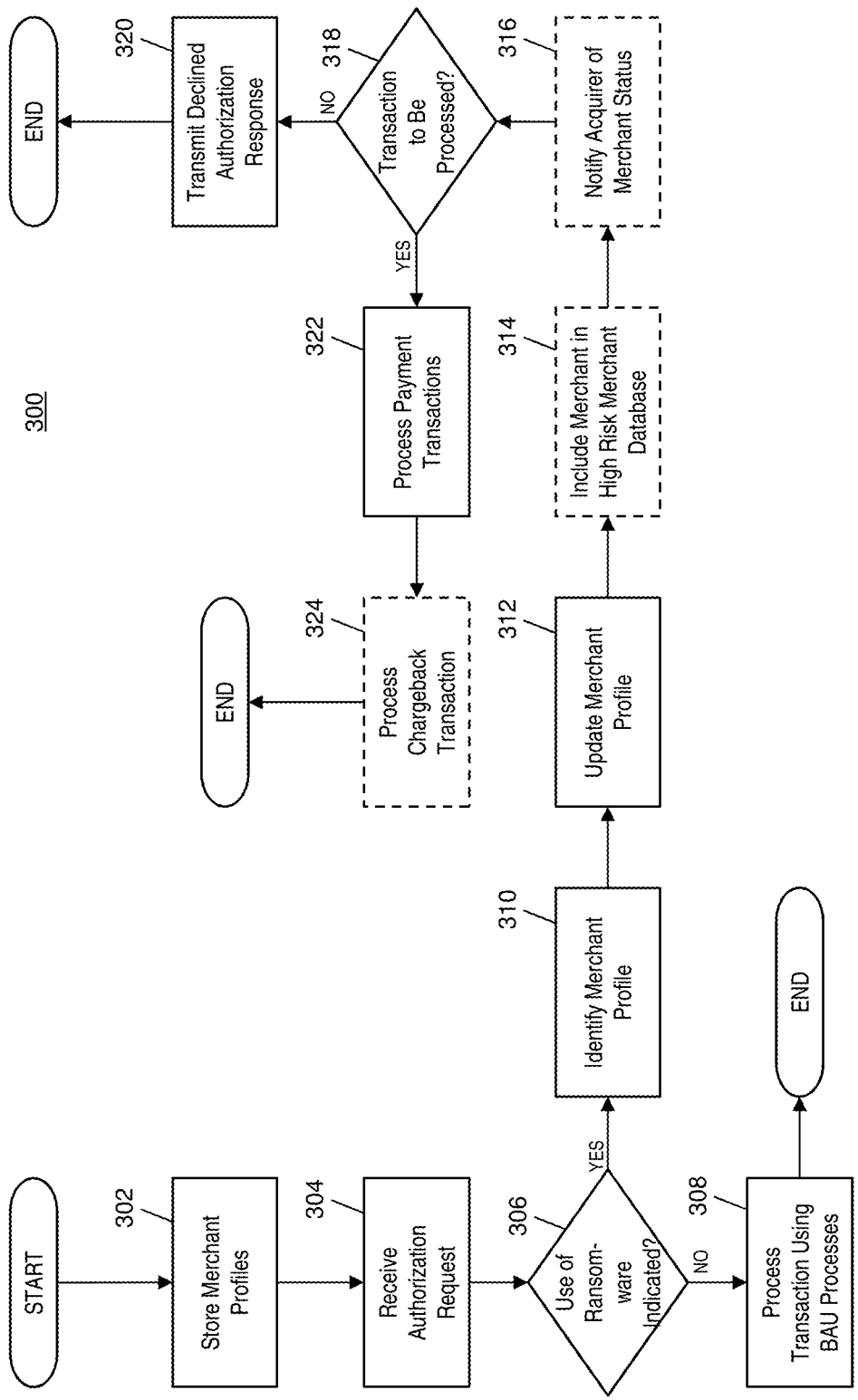
FIG. 3 is a flow diagram illustrating a process for identifying merchants associated with ransomware based on a processed payment transaction in accordance with exemplary embodiments.

FIG. 3 illustrates a process 300 performed by the processing server 110 for the identification of merchants associated with ransomware using transaction data.

In step 302, the processing unit 204 of the processing server 110 may store a plurality of merchant profiles 210 in the profile database 208 of the processing server 110. Each merchant profile 210 may include at least a merchant identifier associated with a related merchant 106. In step 304, the receiving unit 202 of the processing server 110 may receive an authorization request for a payment transaction. The authorization request may include at least a merchant identifier associated with a merchant 106 involved in the payment transaction.

In step 306, the processing unit 204 may determine if the authorization request indicates an association with ransomware. The determination may be based on the authorization request including a specific account identifier, such as one associated with a transaction account used by the payment network 108 or a cooperating entity to pay for ransom in connection with ransomware, including a device identifier associated with a computing device 102 used to get infected with ransomware and pay corresponding ransoms, or including a data value indicative of the transaction being associated with ransomware, such as included by the computing device 102, acquirer 112, payment network 108, or other entity, or other suitable method.

If there is no indication that the transaction is associated with ransomware, then, in step 308, the processing unit 204 may process the payment transaction using business-as-usual (BAU) processes, which may use methods and systems that will be apparent to persons having skill in the relevant art. If there is an indication that the transaction is associated with ransomware, then, in step 310, the processing unit 204 may identify a merchant profile 210 in the merchant database 208 that includes the merchant identifier included in the authorization request and is therefore related to the merchant 106 involved in the payment transaction.

In step 312, the processing unit 204 may update the identified merchant profile 210 to include an indication that the related merchant 106 is associated with the distribution of ransomware. In step 314, the processing unit 204 may also include information associated with the merchant 106, such as the merchant identifier, merchant profile 210, merchant name, etc. in the merchant database 212 to indicate that the merchant 106 is a high risk merchant 214. It will be apparent to persons having skill in the relevant art that step 314 may be an optional step. In optional step 316, the transmitting unit 206 of the processing server 110 may transmit a notification to the acquirer 112 associated with the merchant 106 that indicates that the merchant 106 is associated with the distribution of ransomware.

In step 318, the processing unit 204 may determine if the transaction is to be processed. The determination may be based on a variety of criteria that will be apparent to persons having skill in the relevant art, such as applicable rules or regulations, the transaction account used to fund the payment transaction, payment network 108 policies, etc. If the payment transaction is to be denied, then, in step 320, the transmitting unit 206 may transmit an authorization response to the merchant 106 (e.g., and/or the acquirer 112) indicating that the payment transaction is declined.

If the payment transaction is to be processed, then, in step 322, the processing unit 204 may process the payment transaction using methods and systems that will be apparent to persons having skill in the relevant art. In step 324, the processing unit 204 may also process a chargeback transaction for the payment transaction, due to the use of ransomware in connection with the initial payment transaction. In some embodiments, step 324 may be an optional step.

Exemplary Method for Identifying a Merchant Associated with Ransomware

Figure 4:
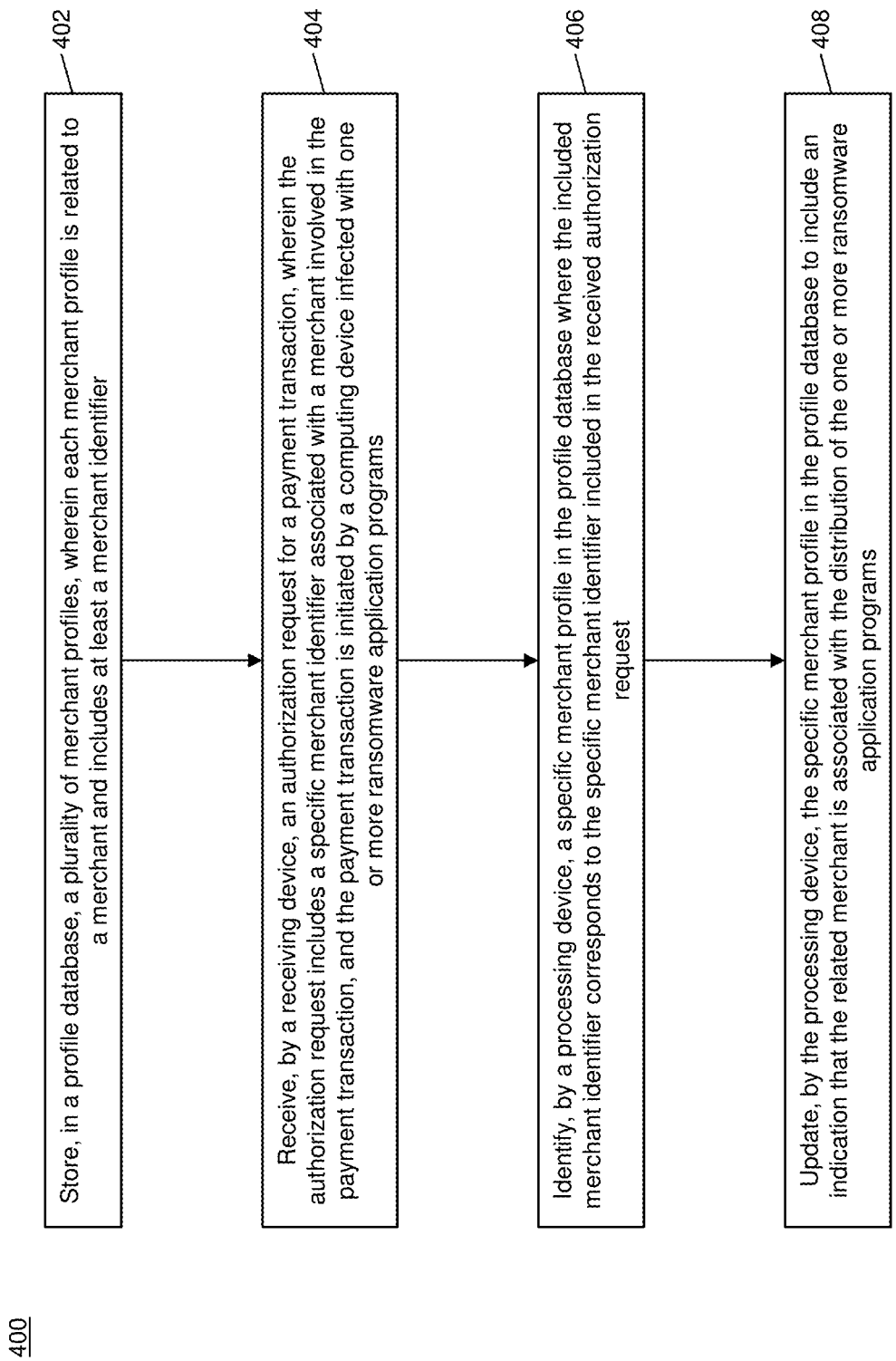
FIG. 4 is a flow chart illustrating an exemplary method for identifying a merchant associated with ransomware in accordance with exemplary embodiments.

FIG. 4 illustrates a method 400 for identifying a merchant associated with ransomware.

In step 402, a plurality of merchant profiles (e.g., merchant profiles 210) may be stored in a profile database (e.g., the profile database 208), wherein each merchant profile 210 is related to a merchant (e.g., a merchant 106) and includes at least a merchant identifier. In step 404, an authorization request for a payment transaction may be received by a receiving device (e.g., the receiving unit 202), wherein the authorization request includes a specific merchant identifier associated with a merchant 106 involved in the payment transaction, and the payment transaction is initiated by a computing device (e.g., the computing device 102) infected with one or more ransomware application programs. In one embodiment, the one or more ransomware application programs may include a rogue security software program. In some embodiments, the authorization request may further include an account identifier, and the account identifier may be indicative of a payment transaction associated with the use of ransomware. In one embodiment, the authorization request may include a data field including a data value indicative of the use of ransomware.

In step 406, a specific merchant profile 210 may be identified in the profile database 208 by a processing device (e.g., the processing unit 204) where the included merchant identifier corresponds to the specific merchant identifier included in the received authorization request. In step 408, the specific merchant profile 210 in the profile database 208 may be updated by the processing device 204 to include an indication that the related merchant 106 is associated with the distribution of the one or more ransomware application programs. In some embodiments, updating the specific merchant profile 210 may include updating the specific merchant profile 210 to include an indication that the related merchant 106 is a high risk merchant.

In one embodiment, the method 400 may further include processing, by the processing device 204, the payment transaction. In a further embodiment, the method 400 may even further include processing, by the processing device 204, a chargeback for the processed payment transaction. In some embodiments, the method 400 may also include transmitting, by a transmitting device (e.g., the transmitting unit 206), an authorization response indicating decline of the payment transaction. In one embodiment, the method 400 may also include transmitting, by the transmitting device 206, a notification to an acquiring financial institution (e.g., the acquirer 112) associated with the merchant 106 involved in the payment transaction, wherein the notification indicates that the merchant 106 is a high risk merchant and/or involved in the distribution of the one or more ransomware application programs.

In some embodiments, the method 400 may further include: storing, in a merchant database (e.g., the merchant database 212), a plurality of high risk merchant profiles (e.g., high risk merchants 214), wherein each merchant profile includes data related to a merchant 106 determined to present a high risk to acquiring financial institutions (e.g., acquirers 112) including at least a merchant identifier; and generating, by the processing device 204, a new high risk merchant profile for storage in the merchant database 212, wherein the new high risk merchant profile is related to the merchant 106 involved in the payment transaction and includes the specific merchant identifier.

Computer System Architecture

Figure 5:
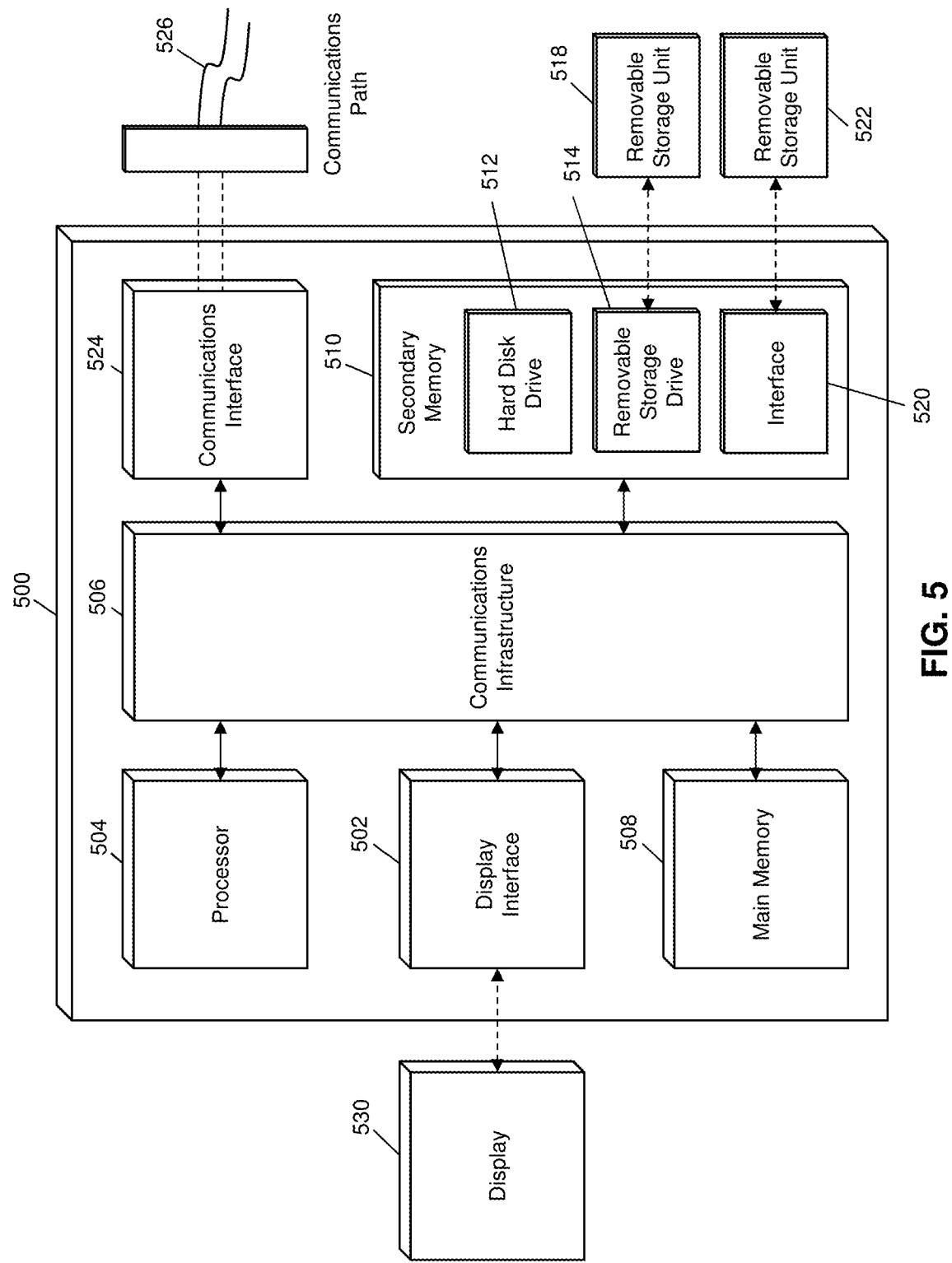
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 110 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

Techniques consistent with the present disclosure provide, among other features, systems and methods for identifying merchants associated with ransomware. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identifying a merchant associated with ransomware, comprising:
    storing, in a profile database of a processing server, a plurality of merchant profiles, wherein each merchant profile is related to a merchant and includes at least a merchant identifier, wherein the processing server is included in a payment network that processes payment transactions;
    in response to a payment transaction paying a demanded ransom, initiated by a consumer computing device infected with one or more ransomware application programs, receiving, by a receiving device of the processing server, from a merchant involved in the payment transaction, an authorization request for the payment transaction, wherein the authorization request includes a specific merchant identifier associated with the merchant involved in the payment transaction, and
    determining, by a processing device, of the processing server, on a basis of information included in the authorization request received from the merchant involved in the payment transaction, that the authorization request includes a ransom payment associated with ransomware;
    upon determining that the authorization request includes a ransom payment associated with ransomware,
    identifying, by a processing device of the processing server, a specific merchant profile in the profile database where the merchant identifier included in the specific merchant profile corresponds to the specific merchant identifier included in the received authorization request;
    updating, by the processing device of the processing server, the specific merchant profile in the profile database to include an indication that the related merchant is associated with the distribution of the one or more ransomware application programs, and
    transmitting, by a transmitting device of the processing server, a notification to an acquiring financial institution associated with the merchant involved in the payment transaction, wherein the notification indicates that the merchant is a high risk merchant and profits from the distribution and use of the one or more ransomware application programs.

2. The method of claim 1, further comprising:
    processing, by the processing device, the payment transaction.

3. The method of claim 2, further comprising:
    processing, by the processing device, a chargeback for the processed payment transaction.

4. The method of claim 1, further comprising:
    transmitting, by the transmitting device, an authorization response indicating decline of the payment transaction.

5. The method of claim 1, wherein updating the specific merchant profile to include an indication that the related merchant is associated with the distribution of the one or more ransomware application programs includes updating the specific merchant profile to include an indication that the related merchant is a high risk merchant.

6. The method of claim 1, further comprising:
    storing, in a merchant database, a plurality of high risk merchant profiles, wherein each merchant profile includes data related to a merchant determined to present a high risk to acquiring financial institutions including at least a merchant identifier; and
    generating, by the processing device, a new high risk merchant profile for storage in the merchant database, wherein the new high risk merchant profile is related to the merchant involved in the payment transaction and includes the specific merchant identifier.

7. The method of claim 1, wherein the one or more ransomware application programs include a rogue security software program.

8. The method of claim 1, wherein the authorization request further includes an account identifier, and the account identifier is indicative of a payment transaction associated with the use of ransomware.

9. The method of claim 1, wherein the authorization request includes a data field including a data value indicative of the use of ransomware.

10. A system for identifying a merchant associated with ransomware, comprising:
    a profile database, of a processing server, configured to store a plurality of merchant profiles, wherein each merchant profile is related to a merchant and includes at least a merchant identifier, wherein the processing server is included in a payment network that processes payment transactions;
    a receiving device, of the processing server, configured to receive, in response to a payment transaction paying a demanded ransom, initiated by a consumer computing device infected with one or more ransomware application programs, an authorization request, from a merchant involved in the payment transaction, wherein the authorization request includes a specific merchant identifier associated with the merchant involved in the payment transaction;

a processing device, of the processing server, configured to determine, on a basis of information included in the authorization request, that the authorization request includes a ransom payment associated with ransomware; and a transmitting device, of the processing server, wherein upon determining that the authorization request includes a ransom payment associated with ransomware, the processing device, of the processing server, is further configured to identify a specific merchant profile in the profile database where the merchant identifier included in the specific merchant profile corresponds to the specific merchant identifier included in the received authorization request, and update the specific merchant profile in the profile database to include an indication that the related merchant is associated with the distribution of the one or more ransomware application programs; and the transmitting device, of the processing server, transmits a notification to an acquiring financial institution associated with the merchant involved in the payment transaction, wherein the notification indicates that the merchant is a high risk merchant and profits from the distribution and use of the one or more ransomware application programs.

11. The system of claim 10, wherein the processing device is further configured to process the payment transaction.

12. The system of claim 11, wherein the processing device is further configured to process a chargeback for the processed payment transaction.

13. The system of claim 10, wherein the transmitting device is further configured to transmit an authorization response indicating decline of the payment transaction.

14. The system of claim 10, wherein updating the specific merchant profile to include an indication that the related merchant is associated with the distribution of the one or more ransomware application programs includes updating the specific merchant profile to include an indication that the related merchant is a high risk merchant.

15. The system of claim 10, further comprising:

a merchant database configured to store a plurality of high risk merchant profiles, wherein each merchant profile includes data related to a merchant determined to present a high risk to acquiring financial institutions including at least a merchant identifier, wherein the processing device is further configured to generate a new high risk merchant profile for storage in the merchant database, wherein the new high risk merchant profile is related to the merchant involved in the payment transaction and includes the specific merchant identifier.

16. The system of claim 10, wherein the one or more ransomware application programs include a rogue security software program.

17. The system of claim 10, wherein the authorization request further includes an account identifier, and the account identifier is indicative of a payment transaction associated with the use of ransomware.

18. The system of claim 10, wherein the authorization request includes a data field including a data value indicative of the use of ransomware.

* * * * *